United States Patent [19]
Tyrner et al.

[11] 3,985,149
[45] Oct. 12, 1976

[54] REVERSING FLOW VALVE

[75] Inventors: Joseph M. Tyrner, Brookside; William E. Watson, Mount Tabor, both of N.J.

[73] Assignee: Allied Chemical Corporation, Morris Township, N.J.

[22] Filed: Apr. 25, 1975

[21] Appl. No.: 571,664

Related U.S. Application Data

[60] Division of Ser. No. 378,749, July 12, 1973, which is a division of Ser. No. 218,605, Jan. 17, 1972, Pat. No. 3,897,800, which is a continuation of Ser. No. 877,720, Nov. 18, 1969, abandoned.

[52] U.S. Cl. .................................... 137/1; 137/309
[51] Int. Cl.² .......................................... F16K 11/07
[58] Field of Search .......... 137/309, 625.43, 625.27, 137/625.69, 310, 1

[56] References Cited
UNITED STATES PATENTS
634,907    10/1899    Newell ............................... 137/309

*Primary Examiner*—Arnold Rosenthal
*Attorney, Agent, or Firm*—E. D. Buff

[57] ABSTRACT

Valve structure for reversing gas flow comprising a housing containing a pair of disposed cylinder chambers, a pair of disposed manifold chambers, inlet and outlet means provided in each pair of said cylinder and manifold chambers, piston means provided in each cylinder chamber positioned therein to selectively effect flow between inlet means in said manifold chamber and outlet means in said cylinder chamber and flow between inlet means in said cylinder chamber and outlet means in said manifold chamber, said pistons slideably arranged in said cylinder chambers and fixedly mounted on piston rods, said rods extending slideably through the walls of the manifold chamber, and driving means connected to said piston rods for inducing said rods to reciprocate thereby effecting sliding motion of the pistons within said cylinder chambers and thereby reverse the flow between the inlet and outlet means in said cylinder chambers.

3 Claims, 5 Drawing Figures

REVERSING FLOW VALVE

This is a division of application Ser. No. 378,749, filed July 12, 1973, now U.S. Pat. No. 3,897,800, which is a division of application Ser. No. 218,605, filed Jan. 17, 1972, now U.S. Pat. No. 3,773,066, which is a continuation of application Ser. No. 877,720, filed Nov. 18, 1969, now abandoned.

REVERSING FLOW VALVE

This invention relates to a novel valve structure, and is directed more particularly to a four-way valve which may be used to rapidly reverse and redirect the flow of gas. It is particularly adapted for controlling and directing large volumes of gaseous reactants and product streams, whether hot or cold, to and from regenerative reactors or furnaces.

In the past it has been the practice to use reversing valves of various types for such applications. In some types, separate valve seats and closures, therefore, are provided for the inlet and outlet ports. In another type, a single valve seat has an inlet and outlet port therein, adapted to be closed alternately by a door sliding on a seat. The reversing valves of the prior art are generally not suitable for scale-up to large sizes. They operate too slowly for those applications wherein a rapid switch in direction of the gas streams is essential, and wherein appreciable mixing of the gas streams during the reversing operation must be avoided.

It is the object of this invention to provide a reversing valve having the capability of reversing and redirecting gas flows very rapidly and completely, and one capable of scale-up for large flow, high volume operations, without loss of its fast acting characteristics, and its ability to avoid mixing of gas streams.

These and other objects are accomplished according to our invention by a valve structure having a housing comprising a pair of cylinder chambers having reciprocating pistons therein and a pair of manifold chambers communicating with said cylinder chambers. Each of the pair of cylinder and manifold chambers has an inlet port and an outlet port. The arrangement of these two pairs of chambers is such, that gas entering the inlet port of the manifold chamber will flow through the outlet port of the cylinder chamber and gas entering the inlet port in the cylinder chamber will leave the outlet port of the manifold chamber. The pistons are so positioned that upon reciprocation the functions of the inlet and outlet ports of the cylinder chambers are reversed.

The pistons, which may be fitted with piston rings, are slideably arranged within the cylinders, and affixed to piston rods. These rods which may consist of hollow shafting, slideably pass through seals in the manifold shells at those points at which they would normally impinge on the manifold shell when extended.

Driving means are provided for inducing a reciprocating motion to the piston assemblies, whereby the sliding motion of the pistons alternately carry them to points in the cylinder chambers beyond the cylinder ports in either direction. The piston rods are structurally connected in a manner such that as one piston slides in the direction of the outlet manifold, the other piston slides oppositely, i.e. toward the inlet manifold.

An important feature of the valve is that the cylinder ports comprise a small fraction of the total distance which the piston travels in the cylinder chamber, so that the operation the piston passes across the cylinder ports at maximum velocity thereby making the switch quickly and cleanly, avoiding intermingling of the reaction and product gases as they pass through the valve.

Also, by passing a gas or vapor under positive pressure through hollow piston rods and suitable passageways to the channel between the piston rings at the periphery of the piston, a seal is produced between the piston and cylinder chamber wall which prevents mixing of the gas streams by movement past the pistons. These same hollow piston rods and passageways may also serve as the means of introducing high temperature and corrosion resistant lubricants, such as molybdenum sulfide, to the sliding surfaces of the piston and cylinder wall to facilitate movement.

The invention and the objects and advantages thereof may be appreciated from consideration of the following description taken in connection with the accompanying drawings, in which.

Figure 1:
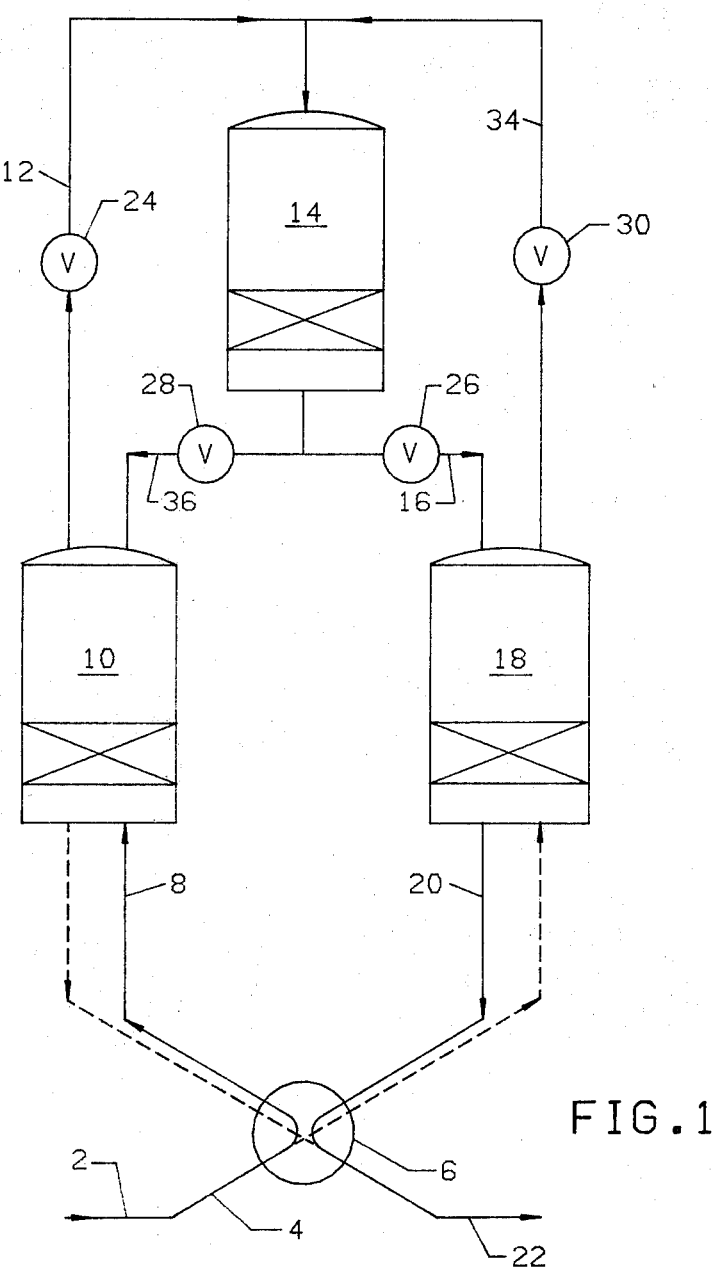
FIG. 1 is a schematic representation of a system in which the valve of the present invention may be employed.

In the schematic diagram shown in FIG. 1, a reaction gas enters the system via line 2 and passes to flow reversing valve 6, via line 4. In the embodiment shown the reaction gases leave valve 6 via line 8 to heat exchange chamber 10 wherein the reaction gases are heated to the desired temperature by any of the well known heat exchange means, e.g. heat exchange tubes, packed refractory column, etc. The reaction gases leave chamber 10 via line 12 and enter reaction chamber 14 wherein the reaction takes place. The product gases exit chamber 14 via line 16 and pass down through heat exchange chamber 18 wherein the product gases are cooled to a desired temperature. The cooled product gases leave chamber 18 and pass to valve 6 via line 20. The product gases pass through valve 6 and leave the system via line 22.

During the above cycle valves 24 and 26 are open and valves 28 and 30 are closed. Once the cycle is reversed, which may take place from every few seconds up to about every hour, reversing flow valve, 6, switches and valves 24 and 26 are closed and valves 28 and 30 are opened. The reaction gases now pass through flow valve 6 to chamber 18 via line 20 (dotted) to reaction chamber 14 via line 34. The product gases leave reactor 14 and pass via line 36 to exchange chamber 10 to valve 6 via line 8 and leave the system via line 22.

Figure 3:
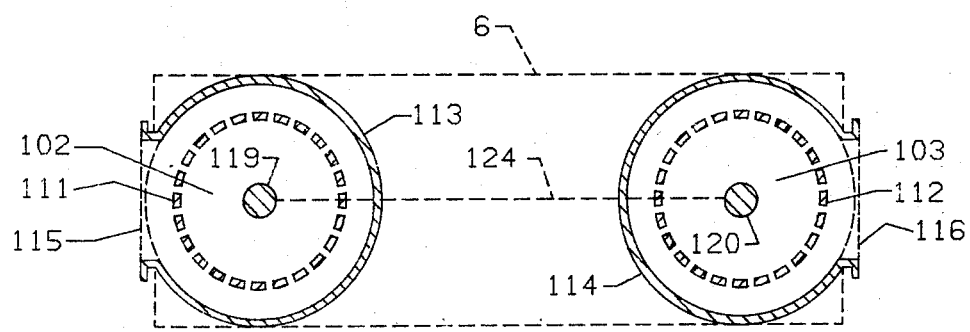
FIG. 3 is a cross sectional view of the valve of FIG. 2, taken along line A,A$^1$.
Figure 2:
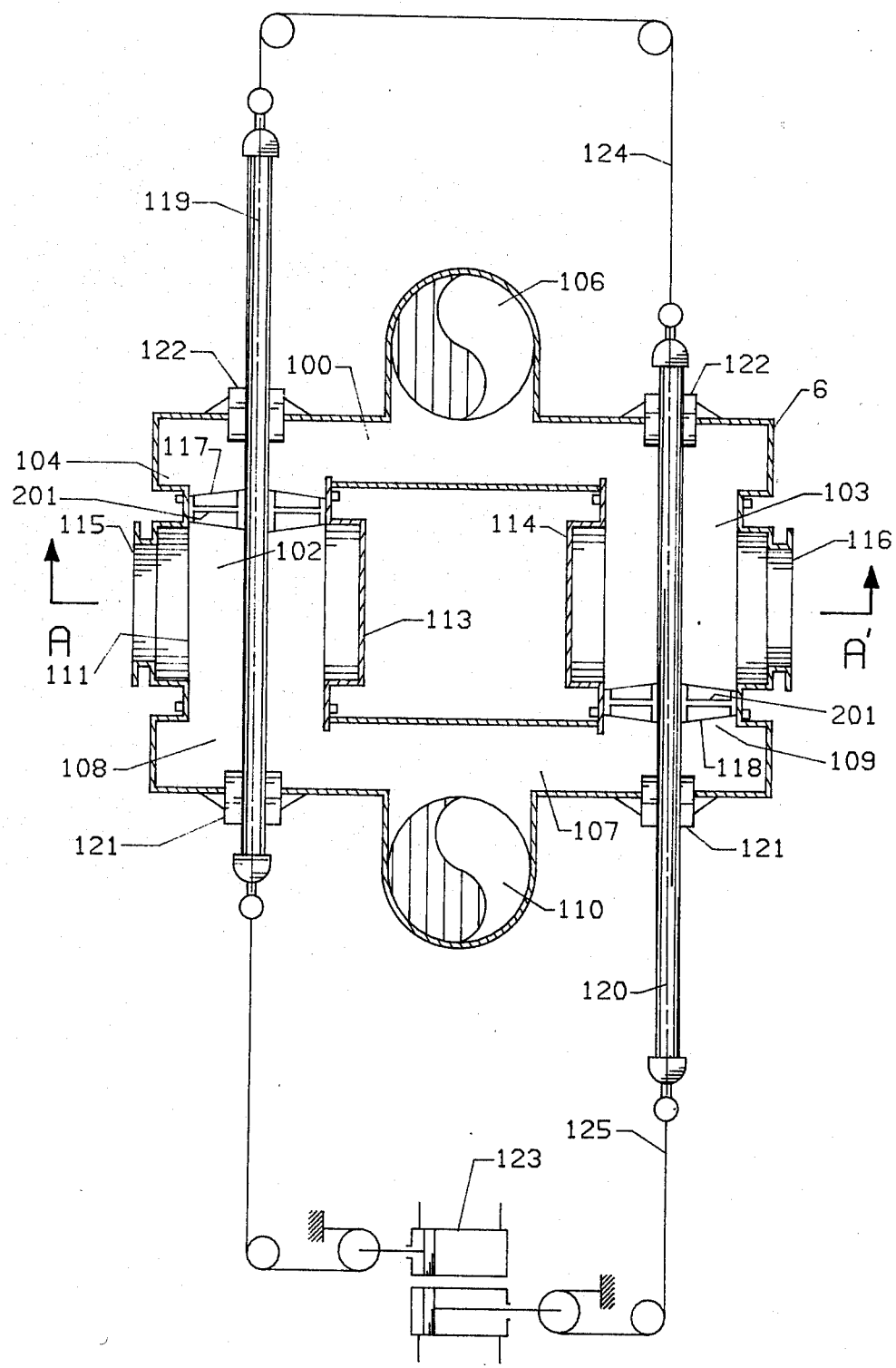
FIG. 2 is a longitudinal vertical section of one embodiment of the reversing valve of the present invention.
Figure 4:
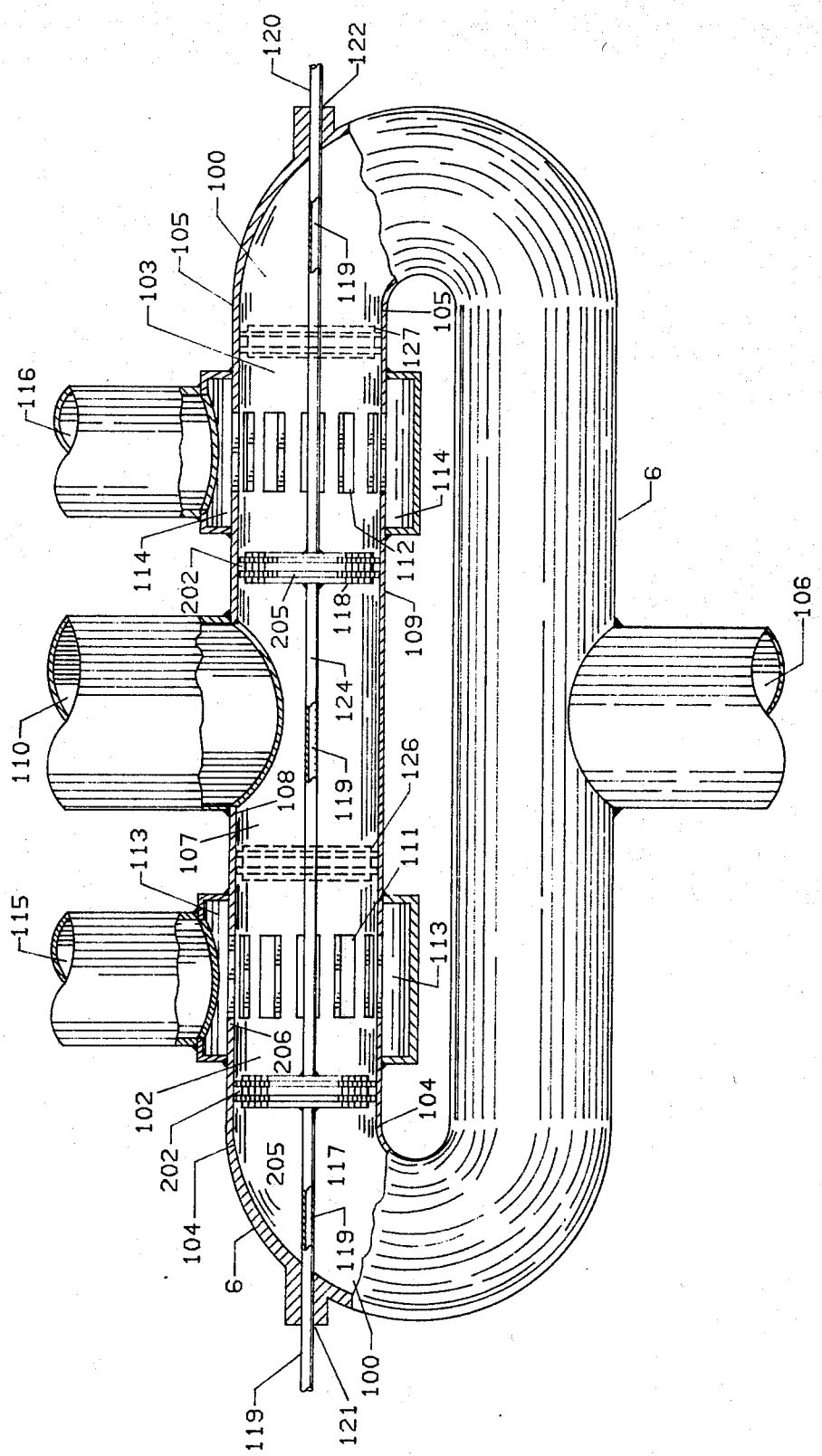
FIG. 4 is a longitudinal vertical section of a structural variation of the reversing valve of the present invention.

Now referring to FIGS. 2, 3, and 4, the valve comprises a housing, 6, with an inlet manifold 100 connecting with cylinder chambers 102 and 103 at points 104 and 105, respectively. The manifold inlet is shown as 106. Similarly, outlet manifold 107 is connected to cylinder chamber 102 and 103 at points 108 and 109, respectively, and is provided with an outlet at 110. Inlet manifold port 106 is connected to line 4 (FIG. 1) and outlet manifold port 110 is connected to line 22 (FIG. 1).

The cylinder ports 111 and 112 may consist of either a single transverse slot (not shown) or a multiplicity of openings centrally grouped in the cylinder wall. In FIG. 3 and 4 they are shown as longitudinal slots representing the preferred embodiment. A jacket 113 and 114, surrounds the cylinder ports having openings 115 and 116 which convey gas either to or from the cylinder ports via line 8 and 20, respectively (FIG. 1).

The piston assemblies comprise pistons 117 and 118 fixed by mounting to piston rods 119 and 120, respectively, which are slideably positioned concentric to cylinder chambers 102 and 103 and extend slideably through the walls of the manifolds at seals 121 and 122.

While the driving means are represented as hydraulic, and shown as 123 in FIG. 2, other modes of driving the pistons in a reciprocating manner may be employed. In FIG. 2 and 3, a structural connection between the piston rods 119 and 120 is shown as 124, so arranged that when one piston slides in the direction of one of the manifolds, the other slides away from it. A manner of connecting the piston rods to the reciprocating driving means, using cables or chain and pulleys or sprockets, is shown in FIG. 2 as 125. The structural connection chosen to maintain this relationship between the two pistons may take many forms. Since the pistons are parallel, and spaced apart, the connection as shown in FIG. 2 is a system of cables or chains and pulleys or sprockets. In FIG. 4, the connection is represented merely by a continuation of the piston rods, joining them as one, since the pistons in this configuration of the valve are aligned.

Figure 5:
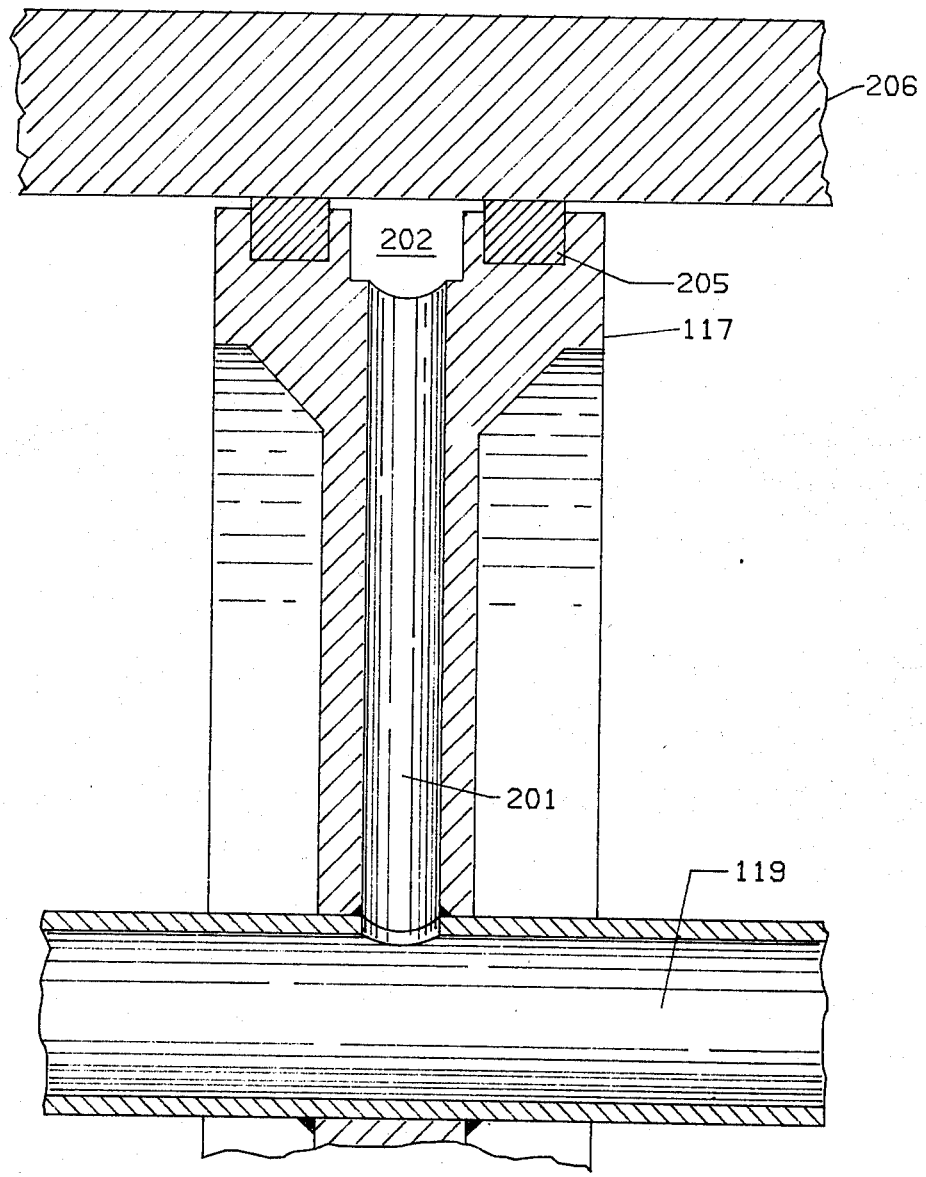
FIG. 5 is a longitudinal vertical section of a portion of the piston assembly of the valve structure of the present invention showing the sealing feature.

FIG. 5 illustrates a method of sealing the pistons against the cylinder chamber walls to prevent by-pass and intermingling of the process gases, by supplying a sealing gas or vapor to the periphery of the pistons. Where the gases being valved are hot, the sealant may be steam. In this variation, piston rod 119 is hollow. Sealing gas under pressure can be conveyed into this hollow shaft or shafts by flexible connections not shown. Passageway 201 conveys the sealing gas from hollow piston rod 119 to an encircling channel 202 in the periphery of piston 117. This same route may be used for the introduction of high temperature corrosion resistant lubricants. A sectional view of a portion of this piston assemblage shows piston 117, piston rings 205 and cylinder chamber wall 206.

The operation of the reversing flow valve of the present invention will be better understood by reference to the above described drawings. In FIGS. 2 and 4, with pistons 117 and 118 in the positions shown, gas entering valve 6 by manifold inlet 106 via line 4 (FIG. 1) is effectively blocked from passage to cylinder chamber 102 by piston 117. Since piston 118 is on the far side of port 112, with respect to the entering gas, the gas leaves the cylinder 103, enters jacket 114, leaving through its opening 116.

In the system as shown in FIG. 1, gas leaving valve 6 would be directed through conduit 8 to heat exchange chamber 10 and would return to the valve as described above, entering from conduit 20 into opening 115 (FIGS. 2 and 4). It enters cylinder chamber 102 through port 111. Its passage to inlet manifold 100 and cylinder chamber 103 is blocked by pistons 117 and 118, respectively, and passes to manifold chamber 107 and leaves by manifold outlet 110 and exits from the system via line 22 (FIG. 1). As the processing conditions require, the reciprocating driving means 123 will cause the pistons to start moving in a reciprocating fashion, reach maximum speed near the mid-point of ports 111 and 112, then decelerate to zero at the end of their strokes at positions 126 and 127, respectively.

Important to this invention is the fact that the distance travelled by the pistons over their respective ports, represents a small fraction of the total distance travelled, and this distance is essentially at the point of maximum velocity of the piston. The switching operation, therefore, takes place in a small fraction of the time it takes the pistons to travel from one end of their respective cylinders to the other.

With the pistons at the opposite ends of the cylinders (not shown) the incoming gas entering at inlet 106 can no longer reach cylinder chamber port 112 since it is now blocked by piston 118, which has moved up toward inlet manifold chamber 100 to position 127 (FIG. 4). The gas enters cylinder chamber 102 and leaves the valve by port 111 which is now in flow communication with inlet manifold chamber 100 by movement of piston 117 towards the outlet manifold chamber 107, to position 126 (FIG. 4). It now can be seen that gas entering inlet 106, which on the previous cycle left via outlet 116, now leaves via outlet 115. Opening 106 is always an inlet, and opening 110 an outlet, but the direction of flow at openings 115 and 116 has been reversed.

We claim:

1. A process for reversing gas flow comprising the steps of:
   a. introducing a gas stream into a valve through an inlet port thereof to a first manifold chamber therewithin;
   b. directing said gas stream from said first manifold chamber to a first cylinder chamber of said valve;
   c. removing said gas stream from said first cylinder chamber by directing said gas stream through a first port therein;
   d. introducing said gas stream into a second cylinder chamber of said valve through a second port of said valve;
   e. directing said gas stream from said second cylinder chamber to a second manifold chamber of said valve;
   f. removing said gas stream from said second manifold chamber by directing said gas stream through an outlet port therein;
   g. reversing the direction of gas flow through said first and second cylinder chamber ports without changing the direction of gas flow through said inlet and outlet ports;
   h. maintaining uninterrupted communication between said inlet port and said first and second ports of said first and second cylinder chambers, and uninterrupted communication between said first and second ports of said first and second cylinder chambers and said outlet port for substantially the entire time during which the direction of gas flow is being reversed said uninterrupted communication being maintained by providing a piston in each of said first and second cylinder chambers, each piston having a first position therein which permits communication between said inlet port and said first port of said first cylinder chamber and communication between said second port of said second cylinder chamber and said outlet port, said pistons being slideably arranged in said first and second cylinder chambers for movement over the first and second ports thereof to a second position in said cylinder chambers which terminates communication between said inlet port and said first port of said first cylinder chamber and communication between said second port of said second cylinder chamber and said outlet port and which provides communication between said inlet port and said second port of said second cylinder chamber and said outlet port; and i. accelerating said pistons to maximum velocity prior to passage thereof over said cylinder chamber ports.

2. A process as recited in claim 1, wherein said first and second cylinder chamber ports have widths extending in the direction of piston movement and said process includes the step of commencing deceleration of said pistons after said pistons have passed over the entire widths of said first and second cylinder chamber ports.

3. A process as recited in claim 1, including the step of decelerating said pistons to rest positions which are proximate locations.

* * * * *